(12) United States Patent
Choi et al.

(10) Patent No.: US 6,331,013 B2
(45) Date of Patent: *Dec. 18, 2001

(54) LIGHTWEIGHT MOTORIZED WHEELCHAIR

(75) Inventors: Oong Choi; Fred E. Ingle, both of Lancaster, PA (US)

(73) Assignee: Wheelchair Carrier, Inc., Waterville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,589

(22) Filed: Dec. 21, 2000

Related U.S. Application Data

(63) Continuation of application No. 09/150,652, filed on Sep. 10, 1998, now Pat. No. 6,183,002.

(51) Int. Cl.$^7$ .................................................. B62B 1/00
(52) U.S. Cl. ................ 280/647; 280/250.1; 280/642; 280/649; 280/650; 280/657; 180/65.1; 180/907
(58) Field of Search ................ 280/647, 250.1, 280/642, 649, 650, 657, 65.1; 180/907

(56) References Cited

U.S. PATENT DOCUMENTS

| | | | |
|---|---|---|---|
| 3,995,882 | 12/1976 | Watkins | 280/650 |
| 4,083,579 | 4/1978 | Basey, Jr. et al. | 280/650 |
| 4,118,052 | 10/1978 | Cabagnero | 280/642 |
| 4,126,331 | 11/1978 | Sloan et al. | 280/642 |
| 4,763,911 | 8/1988 | Gebhard et al. | 280/642 |
| 4,768,797 | 9/1988 | Friedrich | 280/250.1 |
| 4,775,187 | 10/1988 | Herr . | |
| 4,805,712 | 2/1989 | Singleton | 180/65.1 |
| 4,863,181 | * 9/1989 | Howle | 280/650 X |
| 4,887,826 | 12/1989 | Kantner . | |
| 5,018,788 | 5/1991 | Cedergreen . | |
| 5,076,390 | * 12/1991 | Haskins | 280/250.1 |
| 5,192,091 | * 3/1993 | Liu | 280/650 X |
| 5,197,559 | * 3/1993 | Garin, III et al. | 180/907 X |
| 5,306,035 | * 4/1994 | Counts | 280/250.1 |
| 5,363,934 | * 11/1994 | Edmund et al. | 280/65.1 X |
| 5,460,426 | * 10/1995 | Tribelsky et al. | 280/65.1 |
| 5,496,050 | * 3/1996 | Geiger et al. | 280/250.1 X |
| 5,622,376 | * 4/1997 | Shamie | 280/650 |
| 5,634,654 | * 6/1997 | Lin | 280/642 |
| 5,752,738 | * 5/1998 | Onishi et al. | 280/642 X |
| 6,183,002 | * 2/2001 | Choi et al. | 280/647 |

* cited by examiner

*Primary Examiner*—Lanna Mai
*Assistant Examiner*—Toan To
(74) *Attorney, Agent, or Firm*—Emch, Schaffer, Schaub & Porcello Co., L.P.A.

(57) ABSTRACT

A wheelchair having a seat and a plurality of wheels for rolling the wheelchair along a ground surface. A plurality of legs are provided for supporting the seat. Each of the legs is positioned between the seat and one of the wheels. A plurality of struts are also provided. The seat bottom and seat back are pivotally coupled to the seat bottom. The seat back is movable between a folded position and an unfolded position. An actuator for providing at least one actuator output signal in response to movement of the actuator by a user of the device is also provided.

16 Claims, 9 Drawing Sheets

LIGHTWEIGHT MOTORIZED WHEELCHAIR

This application is a continuation of U.S. Ser. No. 09/150,652 filed Sep. 10, 1998, U.S. Pat. No. 6,183,002.

FIELD OF THE INVENTION

This invention relates generally to wheelchairs. More particularly, this invention relates to motorized wheelchairs that are lightweight, foldable and portable.

BACKGROUND

The current mobility assistance market is served by over 450 models of mobility aids produced by more than 150 manufacturers. The four categories of mobility aids currently available include: (1) standard wheelchairs (manual propulsion); (2) ultralight wheelchairs (manual propulsion); (3) three and four wheel scooters (powered propulsion); and (4) powered wheelchairs. Each of these categories of mobility aids are discussed below.

Standard wheelchairs are the conventional, folding wheelchairs which can be seen in hospitals, airports, and shopping malls. They typically come in two models: self propelled, with large wheels which a passenger uses to propel themselves, and "Attendant" models, which have smaller wheels and are meant to be pushed by another person. Both types will typically fold sideways to make transport easier. Standard wheelchairs are typically priced low enough such that health insurance reimbursement is easily obtained for mid-range models based on a physician's prescription. Key shortcomings of standard wheelchairs include their unattractive, orthopedic product designs, and the fact that either physical exertion or an attendant is required to propel the chair.

Ultralight wheelchairs, the newest, most visible products, are currently receiving strong publicity. They are built out of exotic alloys and employ radical new designs in order to be quick and agile. Their reduced weight makes them easy to use and lift, but the frames will not typically fold. They typically are more expensive than standard wheelchairs, and are targeted toward younger, more active users. As a result of their higher cost, health insurance reimbursement is typically available only for an individual with a full-time need and only with a physician's prescription. Key shortcomings of the ultralight wheelchairs include the fact that manual exertion is required to move the chair, the orthopedic nature of the design, and the high price of such chairs limits their availability as a secondary or discretionary aid purchase.

Scooters are built in three and four wheel configurations and come closest to the industry's notion of a "consumer product," mitigating, to a large degree, the "handicapped" stigma associated with wheelchairs. Scooters are designed with thorough attention to aesthetics, are attractive in appearance, and perceived as fun, liberating and free-spirited in use. They are robust enough to function in cross-country and non-access-ready environments. While built to serve the needs of severely disabled individuals able to obtain health insurance reimbursement, scooters are also purchased, on a non-reimbursed basis, by individuals who have mobility difficulties which are not severe enough to qualify for reimbursement.

The most widely sold scooter models cost between three and five times the cost of standard wheelchairs, and weigh around 90 pounds without their batteries. Obtaining health insurance reimbursement for scooters (or any other powered mobility aid) is much more difficult than for manual wheelchairs; it typically requires an acute need (such as full-time impairment), several physicians' prescriptions, and ongoing and consistent follow up by physical therapists or equipment dealers. Key shortcomings of scooters include their high prices, limiting their discretionary purchase acceptability, their large size, making them cumbersome and obtrusive when used indoors or in social situations, and their heavy weight, making scooters difficult to transport, typically requiring disassembly or a van to be transported for use elsewhere.

Powered wheelchairs are becoming more sophisticated and robust with each design iteration. They are currently increasing in weight and cost as the frame designs, mechanicals, and electronics increase in complexity. Since they are designed exclusively for the needs of severely disabled individuals, they are heavy-duty medical appliances, which can handle a wide variety of non-access-ready environments and can overcome significant environmental obstacles. They are currently purchased almost exclusively with health insurance reimbursement, often require the close involvement of a team of healthcare professionals (physicians, physical therapists, wheelchair specialists) to fulfill prescriptive requirements and conduct a customized "fitting" of the wheelchair, and are generally used by individuals with only the greatest degree of impairment or disability. As a powered mobility aid, the procedures and qualifications for health insurance reimbursement are similar in nature, but more extensive, than those required for scooters. Powered wheelchairs will typically cost between four to eight times the cost of standard wheelchairs, and weigh between 80 and 150 pounds (without batteries). Weight has not typically been a consideration for manufacturers of powered wheelchairs, since severely disabled users will normally have modified their lifestyles, transportation means and living environments to accommodate their needs. The key shortcomings of powered wheelchairs include their high price, as they are specialized medical applicants, their heavy weight and large sizes which make them cumbersome to transport, and their unattractive, orthopedic appearance.

Each of the products discussed above is, by and large, derived from the healthcare industry. Such products are largely medical and orthopedic appliances and, because of their cost, appearance, and cumbersomeness, are most suited to individuals with acute mobility difficulties who require full time mobility assistance. They were designed largely for functional use following a trauma and as such are (i) designed for use in all environments (including those that are not handicap access-ready); (ii) unappealing, heavy steel and chrome orthopedic appliances, (iii) heavy and unwieldy which make them difficult or impossible to transport; and (iv) large obtrusive and ungainly in operation.

A final issue surrounding current products relates to their prescriptive nature and the difficulty of obtaining health insurance reimbursement. Standard wheelchairs are easily reimbursed based on a generally prescribed need. Ultralight wheelchairs can be reimbursed if the need is full-time or more specialized and this need is reflected in the prescription. For powered aid reimbursement, either scooters or wheelchairs, the difficulty increases dramatically. Often several physicians will need to support the prescription process, and physical therapists or equipment specialists will need to follow up with the agencies. In all cases, health insurance will only reimburse the cost of a single mobility aid. The costs of any secondary or discretionary aids that may be desired (such as a light wheelchair for transport and use in place of a scooter) are borne solely by the customer.

There are several common attributes that wheelchair and scooter users desire. Each of the products described above meet some, but not all, of these criteria. As Table I below shows, consumers are forced to make substantial compromises when selecting from one of the currently available products. A "WA" in the table below indicates that the criteria is "well-addressed" by the product, and a "PA" indicates that the criteria is "partially addressed" by the product.

TABLE I

Current Mobility Aids & Characteristics

| | Affordable | Transportable | Comfortable | Easy-To-Use | Non-orthopedic | Unobtrusive | Powered | All Terrain |
|---|---|---|---|---|---|---|---|---|
| Standard Wheelchairs | WA | WA | WA | PA | | | | |
| Ultralight Wheelchairs | | WA | WA | PA | | WA | | PA |
| Powered Wheelchairs | | | WA | | | | PA | PA |
| Scooters | | | WA | PA | WA | | PA | PA |

The present invention is designed to satisfy the needs of individuals who are not dependent on a full-time mobility aid; rather it is targeted towards those individuals who experience pain, difficulty or tire easily when walking. As such, it is an object of the present invention to provide a mobility aid for part time discretionary assistance. That is, for use by individuals who are able to walk unaided or with some mobility assistance, but experience pain or tiredness when conducting their daily routines around their home, work, community or shopping centers.

It is a further object of the present invention to provide a mobility aid with an unobtrusive and appealing design which rigorously avoids the traditional "orthopedic" design of conventional wheelchairs, and also avoids the stigma associated with their use. Thus, it is an object of the present invention to provide a mobility aid that can be used by anyone without engendering, to either the user or onlookers, a sense of being handicapped.

It is a further object of the present invention to provide a mobility aid that folds compactly, is lightweight and highly transportable. Thus, as discussed more fully below, the present invention incorporates a frame that is sturdy and rigid when in use, but which can be quickly and compactly folded for transport. Other powered wheelchairs will collapse to a limited degree, but the present invention folds to a small, flat package, weighing less than 25 pounds, which is easily lifted into a car trunk or back seat.

It is a still further object of the present invention to provide a battery powered mobility aid that is highly affordable. Thus, as discussed more fully below, the present invention has an overall low weight and power management electronics that can be driven effectively with a single, small battery (approximately 10 pounds).

It is a still further object of the present invention to provide a powered mobility aid which is easy for a user to control and maneuver during use of the device.

These and other objects and advantages of the invention will become more fully apparent from the description and claims which follow or may be learned by the practice of the invention.

SUMMARY OF THE INVENTION

The present invention is directed to a wheelchair having a seat and a plurality of wheels for rolling the wheelchair along a ground surface. A plurality of legs are provided for supporting the seat. Each of the legs is positioned between the seat and one of the wheels. A plurality of struts are also provided. Each of the struts couples a first of the legs to a second of the legs. Each of the legs bears only compressive force in supporting the seat, and each of the struts bears only tensile force.

In accordance with a further aspect, the present invention is directed to a foldable wheelchair formed from a seat bottom and a seat back pivotally coupled to the seat bottom. The seat back is movable between a folded position and an unfolded position. The seat bottom has a back end formed from a first curved shape, and the seat back has a bottom end formed from a second curved shape. The first curved shape of the seat bottom is sized to mate with the second curved shape of the seat back when the seat back is in the unfolded position.

In accordance with a still further aspect, the present invention is directed to a portable mobility device that includes an actuator for providing at least one actuator output signal in response to movement of the actuator by a user of the device. The actuator is movable over a range of positions, the range of positions being bounded by a minimum speed actuator position at a first end of the range and a maximum speed actuator position at an opposite end of the range. The range of positions includes a mid-point actuator position located on the range exactly midway between the minimum speed actuator position and the maximum speed actuator position. The actuator output signal has a magnitude that is linearly related to the position of the actuator on the range of positions. A non-linear amplifier, responsive to the actuator output signal, is provided for outputting a motor control signal. The motor control signal has a minimum value when the actuator is located at the minimum speed actuator position, a maximum value when the actuator is located at the maximum speed actuator position, and the motor control signal has its median value when the actuator is located between the mid-point speed actuator position and the maximum speed actuator position. The non-linear amplifier thus causes the speed of the device to change least drastically in response to variations in the actuator position when the actuator is closest to its minimum speed position, and the non-linear amplifier causes the speed of the device to change most drastically in response to variations in the actuator position when the actuator is closest to its maximum speed position.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DESCRIPTION OF THE PREFERRED EMBODIMENTS

Figure 2:
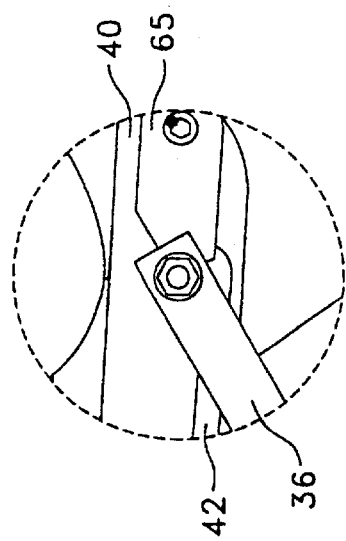
FIG. 2 is an enlarged view showing the connection between a seat support member and the central strut member of the wheelchair shown in FIG. 1.
Figure 3:
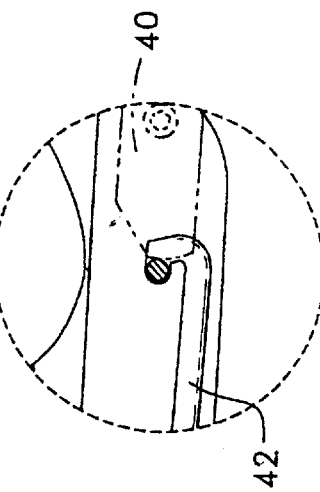
FIG. 3 is an enlarged view of a portion of a seat support member of the wheelchair shown in FIG. 1.

Referring now to FIGS. 1–5, there are shown various views of a lightweight, foldable, and motorized wheelchair 100, in accordance with a preferred embodiment of the present invention. Wheelchair 100 is formed of a seat bottom 10 and a seat back 20. Seat back 20 is pivotally coupled to seat bottom 10 at pivot point P, and is pivotable along arc A. Front wheels 72, 74 and rear wheels 76, 78 are provided for rolling the wheelchair along a ground surface S. Legs 32, 34, 36 and 38 are provided for supporting the seat bottom 10 (and a user) during operation of wheelchair 100. Thus, each one of the legs 32, 34, 36, and 38 is preferably positioned between the seat bottom 10 and a corresponding one of the wheels 72, 74, 76 and 78. Struts 52, 54, 56, 58, 60 and 62 are provided for connecting selected pairs of legs 32, 34, 36 and 38 to one and other. As explained more fully below, during operation of wheelchair 100 when a user is seated on seat bottom 10, legs 32, 34, 36 and 38 bear only compressive force in supporting seat bottom 10, and each of the struts 52, 54, 56, 58, 60 and 62 bears only tensile force. This arrangement of legs and struts provides a highly stable, lightweight and foldable support structure for seat bottom 10.

Figure 1:
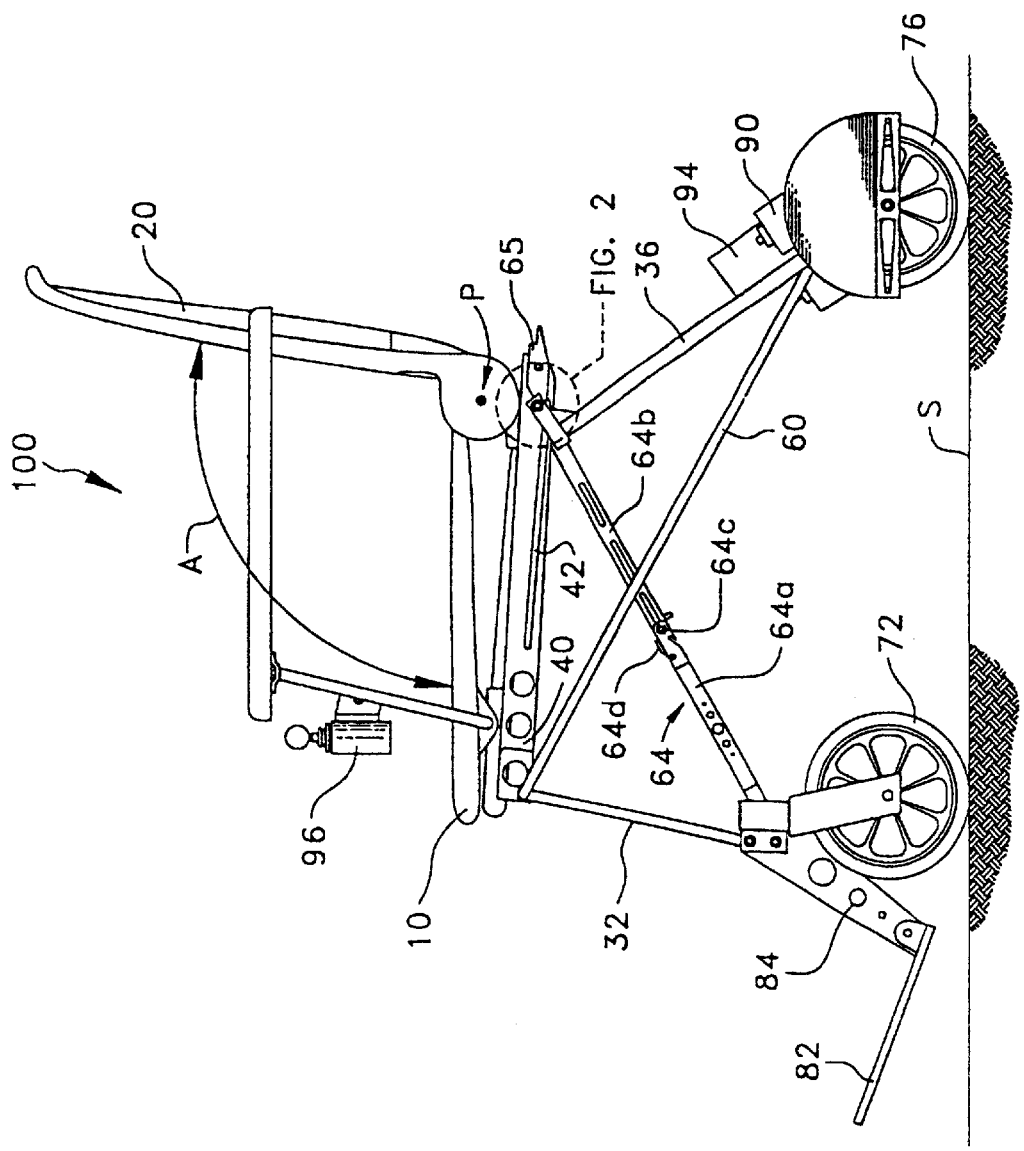
FIG. 1 is a side view of a lightweight, foldable, and motorized wheelchair, in accordance with a preferred embodiment of the present invention.
Figure 4:
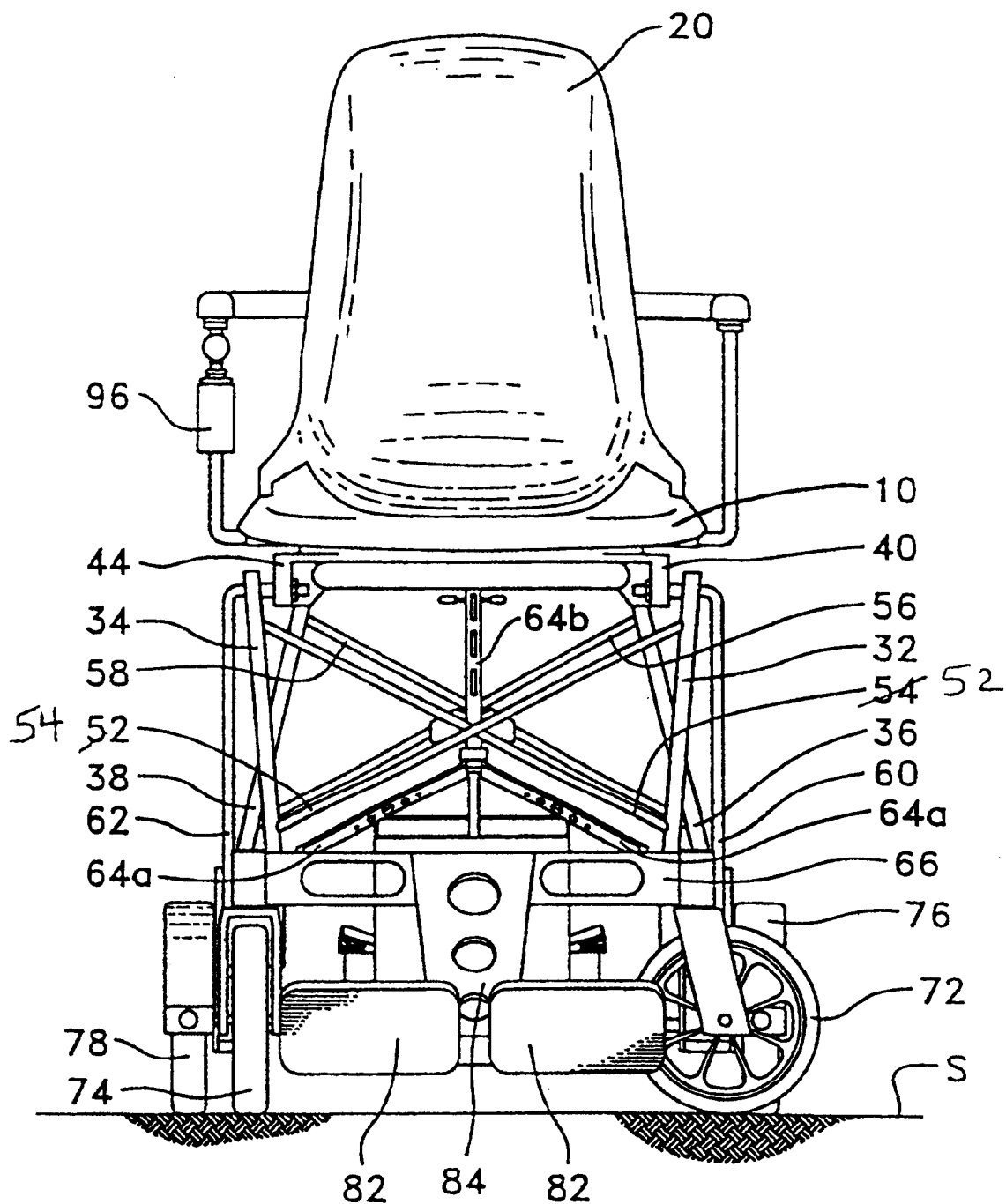
FIG. 4 is a front view of the wheelchair shown in FIG. 1.
Figure 5:
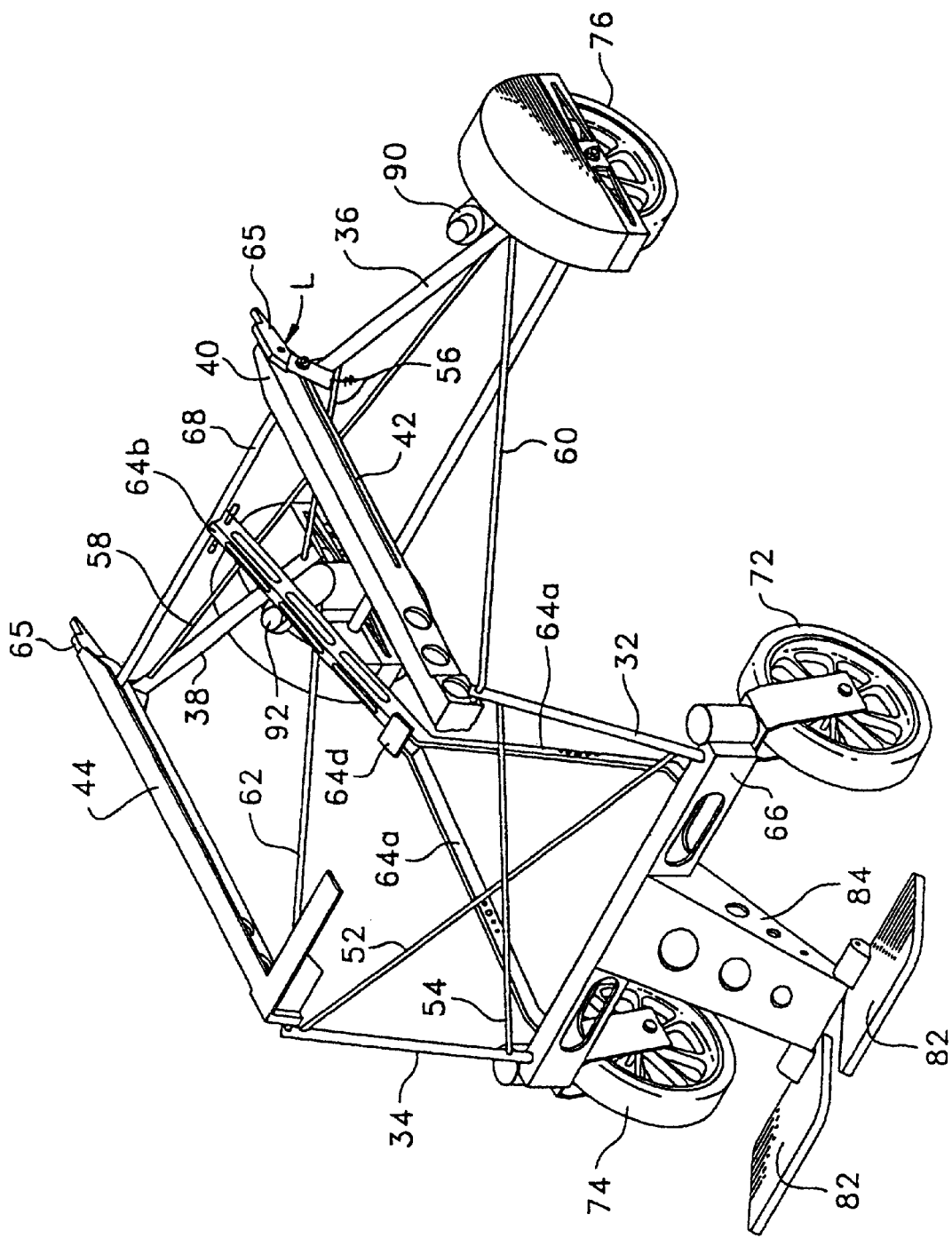
FIG. 5 is a partial isometric view of the wheelchair shown in FIG. 1.
Figure 6A:
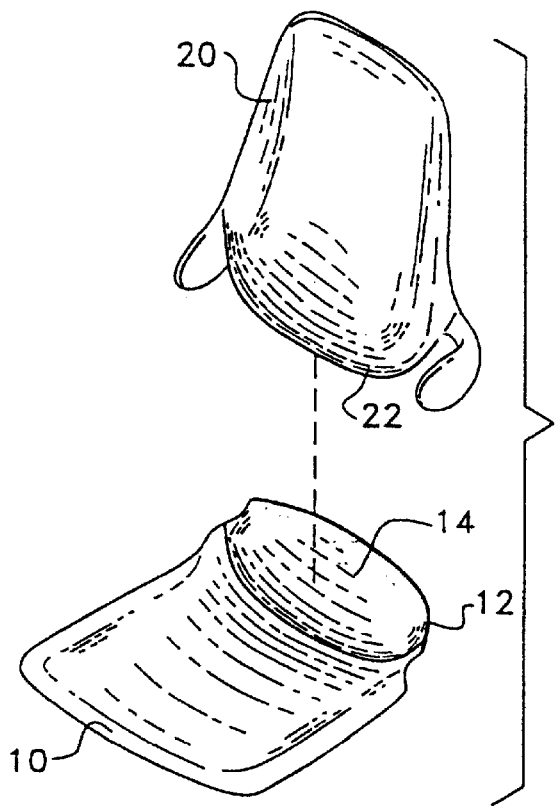
FIG. 6A is an exploded view of the seat bottom and seat back of the wheelchair shown in FIG. 1, showing a mating curvature used for connecting the seat bottom and seat back.
Figure 6B:
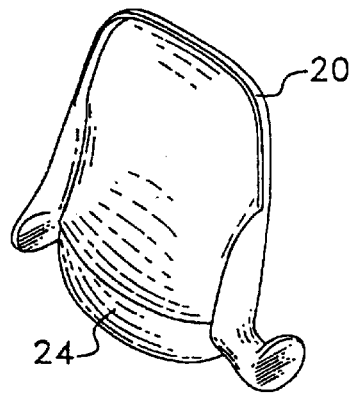
FIG. 6B is a rear view of the seat back shown in FIG. 6A.
Figure 6C:
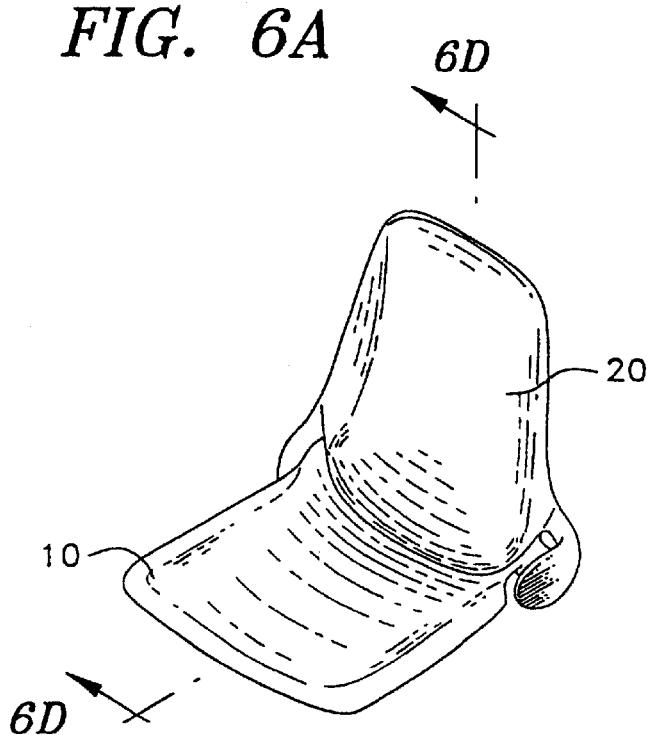
FIG. 6C shows the seat bottom and seat back of the present invention in their fully-unfolded position.
Figure 6D:
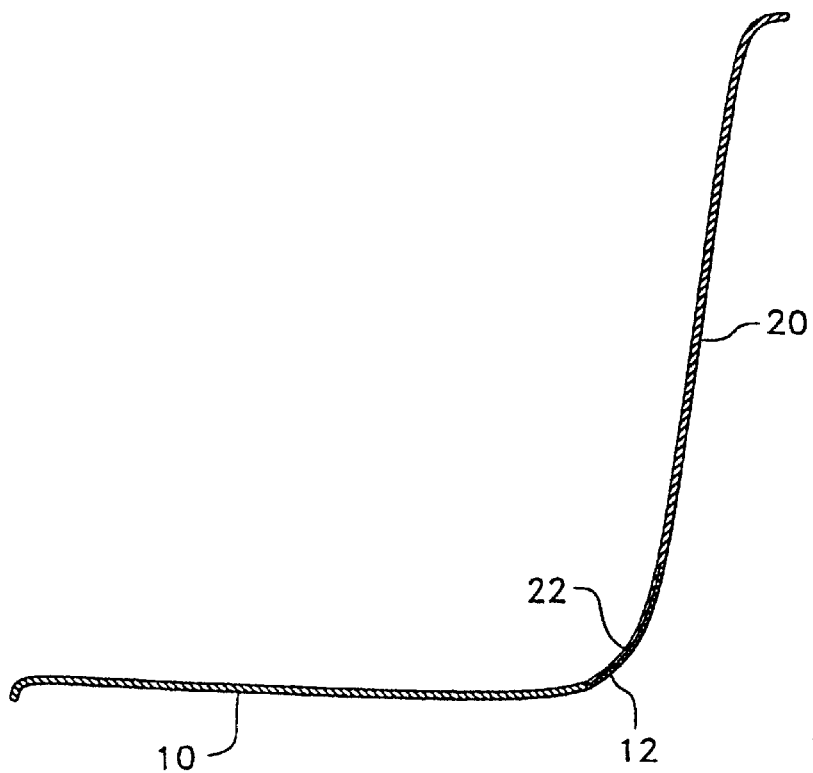
FIG. 6D is a cross-sectional view of 6C, and shows the seat bottom and seat back of the present invention in their fully-unfolded position.
Figure 6E:
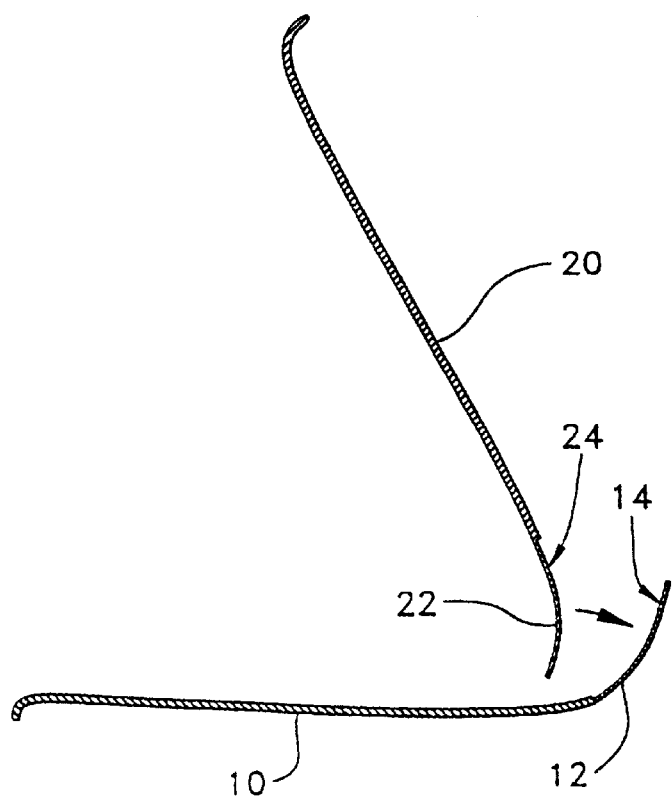
FIG. 6E is a cross-sectional view of the seat bottom and seat back of the present invention shown in their partially folded position.

As shown in FIGS. 1, 4 and 5, each of the legs 32, 34, 36 and 38 is preferably positioned at an acute angle with respect to the ground surface S. In the preferred embodiment, legs 32 and 34 are positioned at angle of about 67 to 72 degrees with respect to surface S, and legs 36 and 38 are positioned at an angle of about 57 to 62 degrees with respect to surface S. The upper ends of legs 32 and 36 are pivotally coupled to seat support bar 40 which, in turn, is rigidly coupled to seat bottom 10. Similarly, the upper ends of legs 34 and 38 are pivotally coupled to seat support bar 44 which, in turn, is rigidly coupled to seat bottom 10. Each of the seat support bars 40, 44 includes an internal track 42 for guiding and restraining the upper ends of legs 36 and 38. When wheelchair 100 is in its unfolded position (shown in FIGS. 1, 2, 4 and 5), the upper end of each leg 36, 38 is locked in position at one end of a track 42 by a pivoting locking bar 65. During the folding of wheelchair 100, each locking bar 65 is pivoted about a point L (by depressing one end of the bar 65) in order to release the upper ends of legs 36, 38. Once the legs 36, 38 are so released, the upper ends of legs 36, 38 are free to slide along tracks 42, thus facilitating the folding of the wheelchair 100 as shown in FIG. 5.

As shown more particularly in FIGS. 4 and 5, strut 52 rigidly connects the top end of leg 34 to the bottom end of leg 32, and strut 54 rigidly connects the top end of leg 32 to the bottom end of leg 34. Similarly, strut 58 rigidly connects the top end of leg 38 to the bottom end of leg 36 and strut 56 rigidly connects the top end of leg 36 to the bottom end of leg 38. Strut 60 is pivotally connected at one of its ends to the top end of leg 32 and is pivotally connected at its other end to the bottom end of leg 36. Similarly, strut 62 is pivotally connected at one of its ends to the top end of leg 34 and is pivotally connected at its other end to the bottom end of leg 38.

Referring now to FIGS. 1, 4 and 5, cross-beam 66 is provided for rigidly coupling the bottom end of leg 32 to the bottom end of leg 34. A further cross-beam 68 is provided for rigidly coupling seat support member 40 to seat support member 44. A foldable strut 64 spans between cross-beam 66 and cross-beam 68. Foldable strut 64 includes a pair of angled members 64a, each of which is rigidly connected to cross-beam 66. Foldable strut 64 also includes a member 64b which is pivotally mounted to cross-beam 68. During operation (use) of wheelchair 100 by a user, angled members 64a are rigidly coupled to member 64b by a releasable locking means 64d. During the folding of wheelchair 100, locking means 64d is released, allowing strut 64 to fold about its midpoint 64c.

Figure 9:
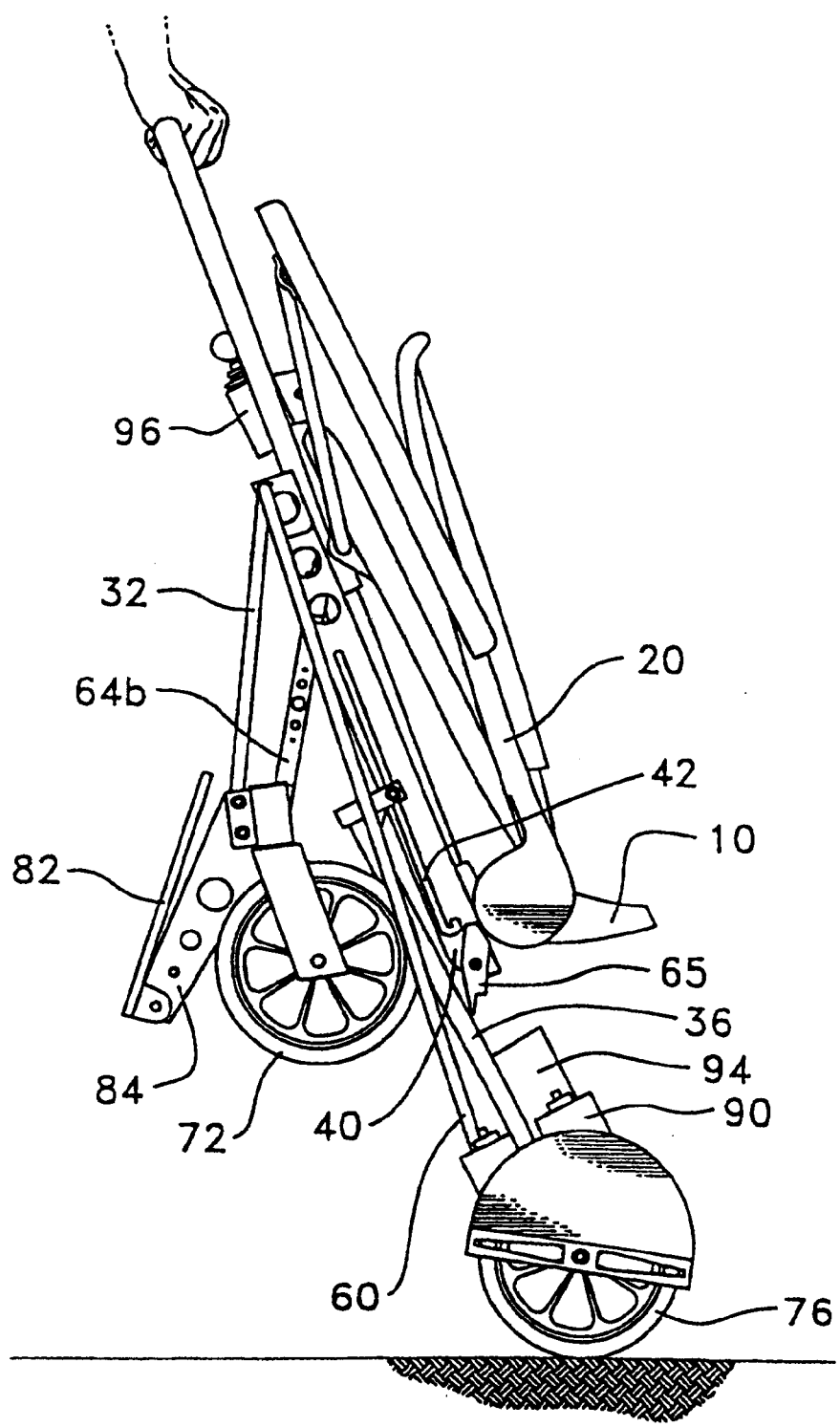
FIG. 9 is a side view showing the wheelchair of FIG. 1 in a fully-folded position.

In the preferred embodiment, a foot rest support member 84 is rigidly affixed to cross-beam 66. A pair of foot supports 82 are pivotally mounted to member 84. During operation of the wheelchair 100, foot supports 82 are preferably placed in their unfolded position (shown in FIG. 1). During folding of the chair, the upper ends of foot supports 82 are pivoted towards support member 84 (as shown in FIG. 9). Adjustment screws (not shown) are preferably provided for adjusting the height of the foot supports 82 in order to customize wheelchair 100 for users of different heights.

The legs, struts, cross-beams and support members discussed above are preferably formed from a material that is lightweight and strong. In a particularly preferred embodiment, where the legs, struts, cross-beams and support members are formed of aircraft aluminum, high tensile steel, or fiber composite material, the total weight of wheelchair 100 (not including the weight of batteries) may be made less than 25 pounds.

Figure 8:
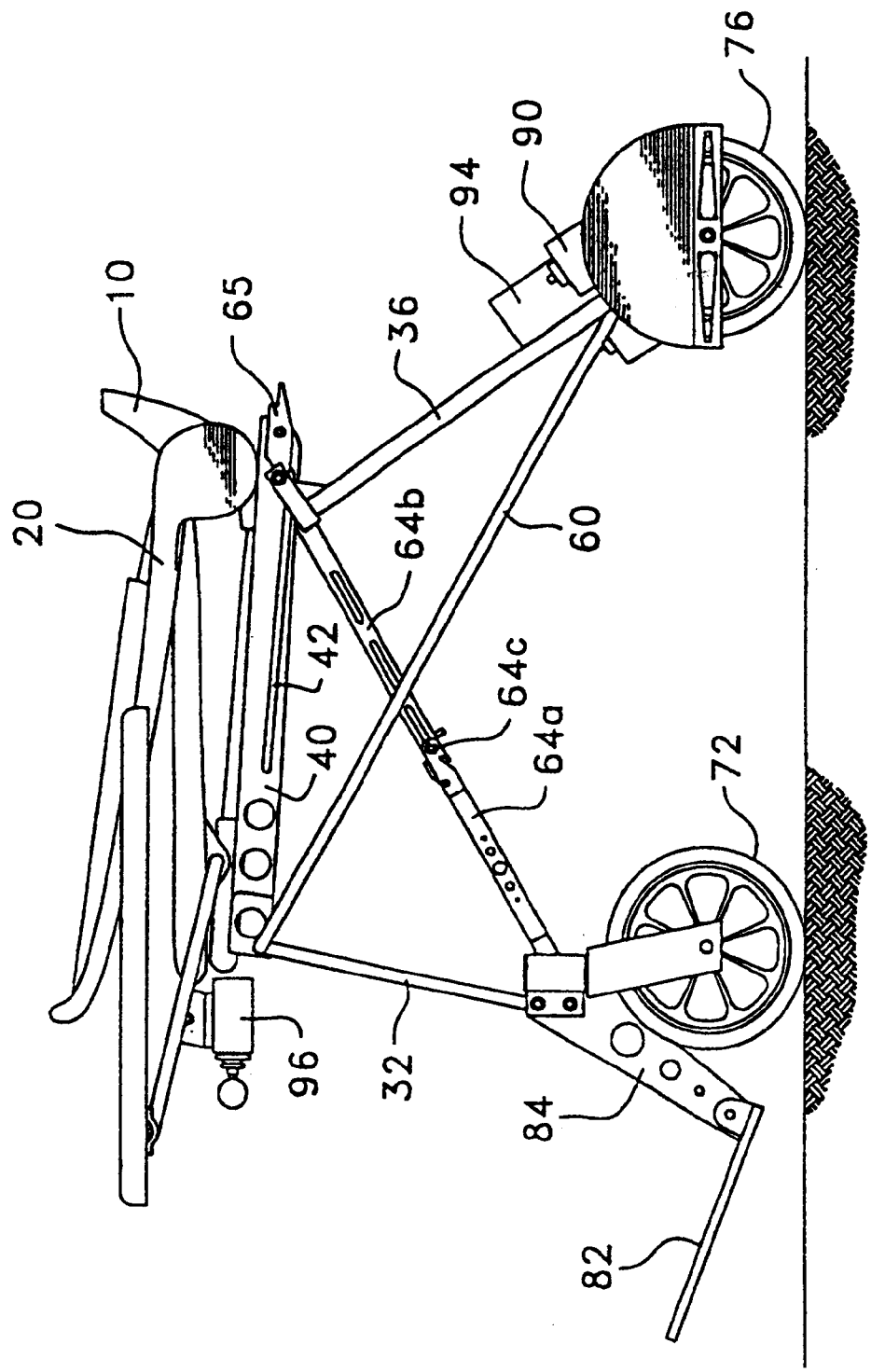
FIG. 8 is a side view showing the wheelchair of FIG. 1 in a partially-folded position.

Referring now to FIGS. 6A–6E, there are shown several views illustrating a mating curvature used for connecting the seat bottom 10 and seat back 20 of wheelchair 100. The seat bottom 10 has a back end 12 formed from a first curved shape 14. The seat back 20 is pivotally coupled to the seat bottom 10 as described above, and is movable between folded positions (shown in FIGS. 6E, 8 and 9) and an unfolded position (shown in FIGS. 1, 4, 6C and 6D). The seat back 20 has a bottom end 22 formed from a second curved shape 24. The curved shape 14 of the seat bottom 10 is sized to mate flush with the curved shape 24 of the seat back 20 when the seat back is in its unfolded position. As shown by a comparison of FIGS. 1 and 8, the seat back 20 is oriented at a minimum angle (approximately 0 degrees) with respect to the seat bottom 10 when the seat back is in its folded position, and the seat back 20 is oriented at a maximum angle (approximately 100 degrees) with respect to the seat bottom 10 when the seat back 20 is in its unfolded position. During operation of the wheelchair 100, when a user is positioned seated on seat bottom 10 and leaning against seat back 20, seat back 20 is preferably restrained from pivoting or extending beyond the maximum angle solely by the back end 12 of the seat bottom 10. In other words, the mating curvature formed between seat bottom 10 and seat back 20 preferably forms the sole stop restraining backward movement of the seat back 20 (beyond the limit of arc A) when a user sits in seat bottom 10 and leans against seat back 20. By forming this stop solely from the mating curvature between the seat bottom 10 and the seat back 20, the number of components in wheelchair 100 is minimized, thereby reducing the final weight of the wheelchair.

The seat bottom 10 and the seat back 20 discussed above are preferably formed from a material that is lightweight and strong. In a particularly preferred embodiment, the seat bottom 10 and the seat back 20 are formed of fiber glass reinforced plastic.

Figure 7A:
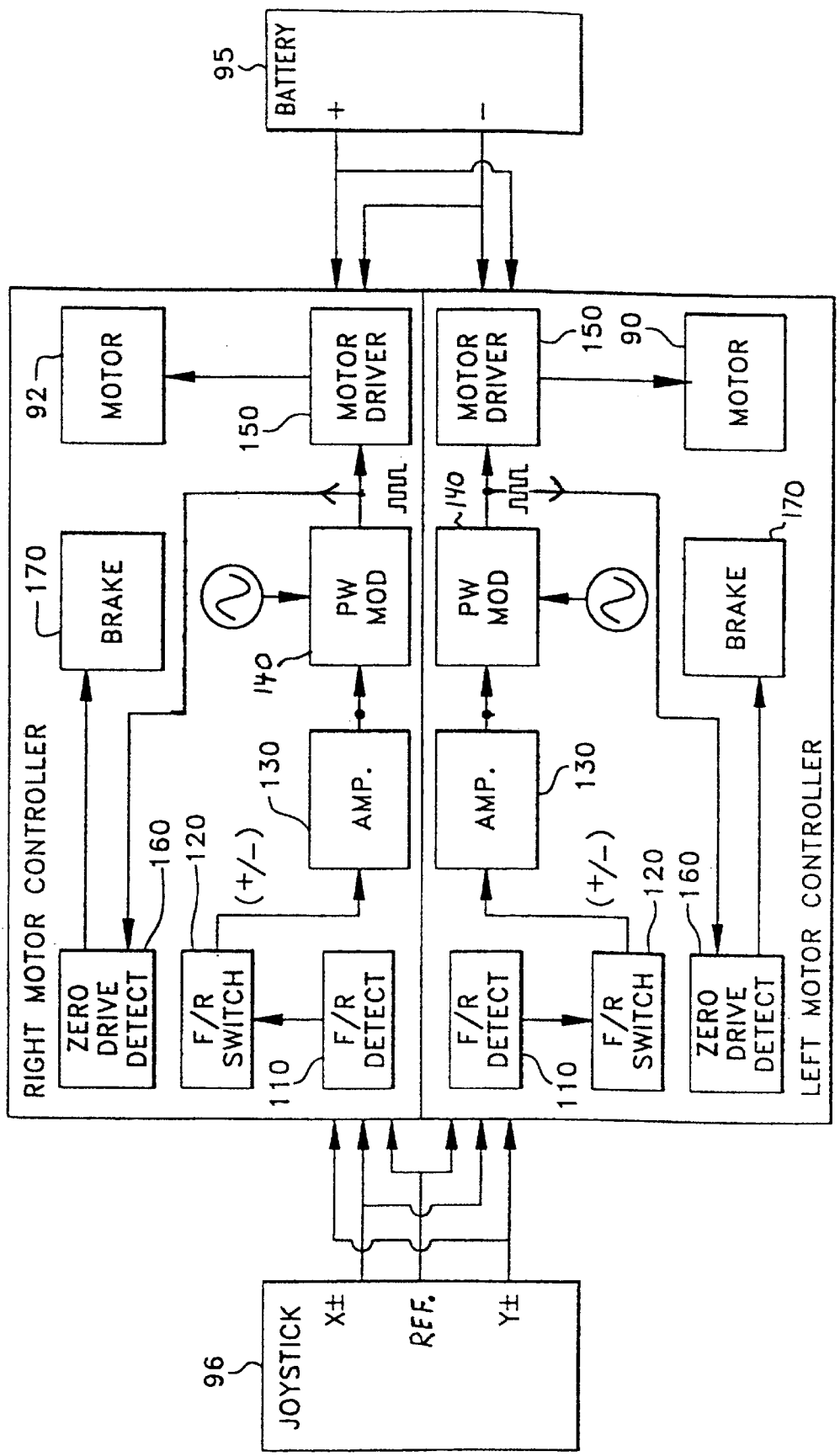
FIG. 7A is a block diagram showing the operation of controllers for driving the motors of the wheelchair shown in FIG. 1, in accordance with a preferred embodiment of the present invention.

Referring now to FIG. 7A, there is shown a block diagram illustrating the operation of two controllers for driving independent motors 90 and 92 of the wheelchair shown in FIG. 1, in accordance with a preferred embodiment of the present invention. Motor 90 is preferably coupled to and drives rear wheel 76, and motor 92 is preferably coupled to and drives rear wheel 78. Joystick actuator 96 is a standard joystick and, as such, it provides three output signals namely, an X(+/−) signal, a Y(+/−) signal, and a reference signal. The X(+/−) signal and Y(+/−) signal represent the x-y coordinates on a Cartesian plane which correspond to the "angle" and "direction" at which the joystick is positioned at any given moment in time. When no force is applied to joystick actuator 96, the joystick is preferably aligned in a vertical position such that the joystick is straight-up-and-down. When the joystick is aligned in this straight-up-and-down position, the "angle" of the joystick relative to the vertical axis is zero. As a user imparts an actuation force to the joystick, the angle between this vertical axis and joystick becomes positive and, as explained more fully below, the velocity of the wheelchair increases (non-linearly) as the angle between the vertical axis and the joystick increases. Joystick 96 can thus be positioned by a user at any location within a range of possible angles in order to vary/control the speed of the wheelchair. The range of angles typically varies from a minimum of angle of 0 zero degrees (when the joystick is straight-up-and-down) and a maximum angle of about 30 degrees (when the joystick is tilted as far as it will go away from the vertical axis). The "angle" at which the joystick is positioned relative to the vertical axis at any given moment in time corresponds linearly to the Euclidean magnitude represented by the X(+/−) and Y(+/−) signals output by the joystick 96. Similarly, the "direction" (along a 360 degree azimuth) toward which the tilted joystick points at any given moment in time corresponds to the Euclidean angle represented by the inverse cosine of the X(+/−) and Y(+/−) signals output by the joystick 96. A standard joystick actuator, such as that manufactured by CH Products, Vista, Calif., under Part #100-800 IJ 1DM, may be used to implement joystick actuator 96.

Figure 7B:
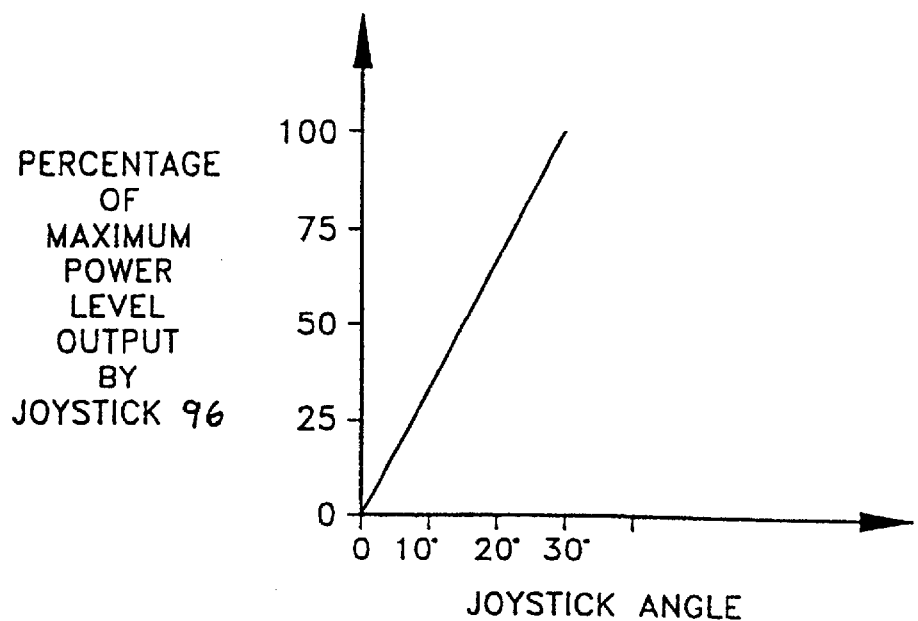
FIG. 7B is a diagram showing the linear relationship between the actuation angle imparted (by a user) to a joystick and the magnitude of the signals output by the joystick in response to such actuation angle.

Referring still to FIG. 7A, the X(+/−) and Y(+/−) signals described above, together with a power signal from battery 95 are provided to both a right motor controller (for driving motor 92) and a separate left motor controller (for driving motor 90). Initially, the X(+/−) and Y(+/−) signals are provided to a forward/reverse (f/r) detector 110 in each motor controller. Based on the Euclidean angle represented by the inverse cosine of the X(+/−) and Y(+/−) signals, the f/r detector 110 in the right motor controller determines whether motor 92 should move in the forward or reverse direction. Similarly, based on the Euclidean angle represented by the inverse cosine of the X(+/−) and Y(+/−) signals, the f/r detector 110 in the left motor controller determines whether motor 90 should move in the forward or reverse direction. The output of each f/r detector 110 is supplied to a corresponding f/r switch 120, which in turn functions to bias the output of an amplifier 130. As mentioned above, the Euclidean magnitude represented by the X(+/−) and Y(+/−) signals output by the joystick 96 corresponds linearly to the "angle" at which the joystick is positioned relative to the vertical axis at any given moment in time. Thus, as shown by the graph shown in FIG. 7B, the power level of the X(+/−) and Y(+/−) signals output by joystick actuator 96 varies linearly from a zero power level when the joystick is in its purely vertical position to a maximum 100% power level when the joystick is tilted as far as it will go away from the vertical axis.

Figure 7C:
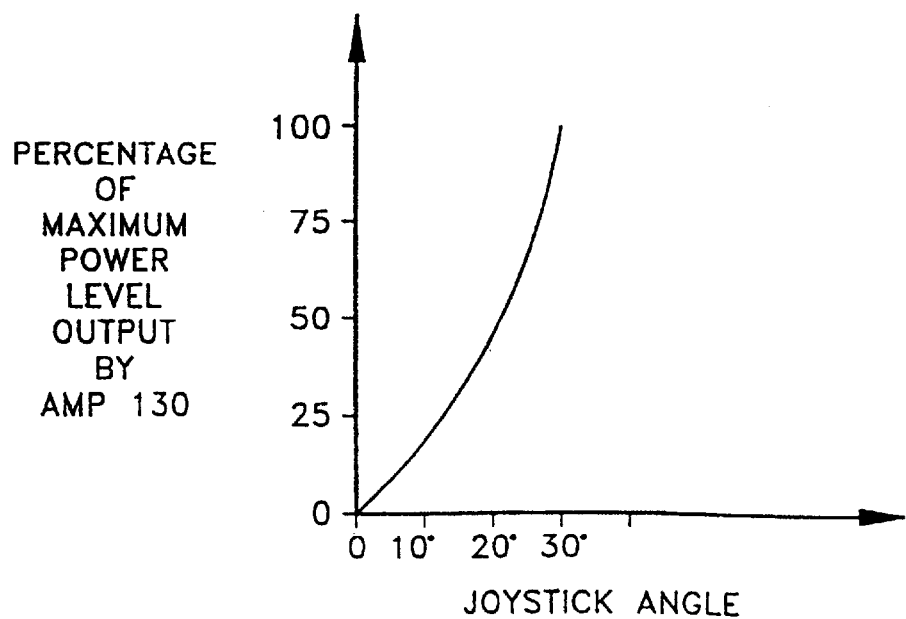
FIG. 7C is a diagram showing the non-linear relationship between the actuation angle imparted (by a user) to a joystick and the magnitude of the signals output by an amplifier in response to such actuation angle, in accordance with a preferred embodiment of the present invention.

As shown particularly in FIG. 7C, each non-linear amplifier 130 outputs a voltage that is related non-linearly to the power level of the X(+/−) and Y(+/−) signals output by joystick actuator 96. In the preferred embodiment shown in FIG. 7C, where the joystick angle may vary between a minimum angle of zero degrees and a maximum angle of 30 degrees, the voltage output by amplifier 130 is significantly less than 50% of maximum (and preferably only about 30% of the maximum) when the joystick is positioned 15 degrees from the vertical (i.e., when the joystick is half-way between its minimum angle of zero degrees and its maximum angle of 30 degrees.) The non-linear amplifiers 130 thus cause the speed of the motors 90, 92 to change least drastically in response to variations in the joystick angle when the joystick is closest to its purely vertical angle, and the non-linear amplifiers 130 cause the speed of the device to change most drastically in response to variations in the joystick angle when the joystick is tilted as far as it will go away from the vertical axis. As a result of the use of non-linear amplifiers 130 having response curves such as that shown in FIG. 7C, it is believed that a user of the present mobility device is better able to control and maneuver the device, because the user has finer control of the wheelchair at lower speeds.

Referring again to FIG. 7A, the output of each non-linear amplifier 130 is provided to a pulse-width (PW) modulator 140. Each PW modulator 140 is coupled to an oscillator having a frequency of about 15 Khz to 20 Khz. In response to the voltage output by an amplifier 130, each PW modulator 140 produces a pulse-width modulated signal. The width of the pulses in this signal is linearly related to the level of the voltage signal provided to the PW modulator 140 by an amplifier 130. The pulse-width modulated signal output by modulator 140 is provided to a motor driver 150.

The output of each PW Modulator 140 is also provided to a zero-drive detector 160. Each zero-drive detector 160 monitors the signal output by a PW Modulator 140 to determine when the PW Modulator output signal has a zero duty cycle. When the PW Modulator output signal has a zero duty cycle, this corresponds to a state when the joystick actuator 96 is in its purely vertical position and no force is being applied to the joystick by a user. When the joystick 96 reaches this purely vertical position, it is desirable for the wheelchair 100 to come to a stop as soon as is comfortably possible and for the wheelchair to remain in a stopped position thereafter until the user moves the joystick 96 from its purely vertical position. Accordingly, when a zero-drive detector 160 detects that the PW Modulator output signal duty cycle is zero, the zero-drive detector 160 sends a signal to a brake circuit 170. Each brake circuit 170 functions to shunt the output of one of the motors 90, 92, thereby resulting in dynamic braking action.

A standard gel lead acid battery, such as that manufactured by Yuasa-Exide under model number NPG18-12 may be used to implement battery 95. Battery 95 is preferably stored in battery case 94 during operation of wheelchair 100.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A powered mobility aid comprising a seat having a top surface and a bottom surface and a seat back flexibly engaged therewith, a foldable support frame having a plurality of wheels fixed to the seat, and a power source engaged with at least two of said wheels for applying a driving force to said wheels, wherein said foldable support frame includes:

two track members positioned in a parallel and spaced relationship on the bottom surface of said seat, each track member extending from a point proximate said seat back toward the front edge of the seat;

two front legs, each front leg pivotally engaged with the bottom surface of said seat, a front cross-beam extending between and fixed to said two front legs at a location spaced from said seat and proximate the distal ends of said front legs, two of said wheels each being attached to said front cross beam and front leg combination proximate the respective distal ends of each of said front legs, at least one front reinforcing member fixed between said two front legs;

two rear legs, each rear leg engaged with a respective track member and being slidable in said respective track member, two of said wheels each being attached respectively proximate the distal end of each of said two rear legs, at least one rear reinforcing member fixed between said two rear legs;

at least one side reinforcing member located on each side of said support frame;

a locking member extending from the bottom surface of said seat and to said front cross beam, said locking member being engaged and locked when said frame is in a fully extended position and also when said frame is in a completely folded position; and track locking members for locking said rear legs in position on said tracks when said frame is fully extended.

2. The powered mobility aid of claim 1 further including a foot rest member proximate said front cross beam.

3. The powered mobility aid of claim 2 wherein said foot rest member includes at least one support member pivotally engaged to fold between an open position to receive a user's feet and a closed position for storage.

4. The powered mobility aid of claim 1 wherein said power source includes a battery pack and two electric motors, one motor engaged with each rear wheel respectively and a control stick in communication with said battery pack and each electric motor for independently operating each of said motors to drive and steer the powered mobility aid.

5. The powered mobility aid of claim 4 wherein said rear wheels are fixed in one operable position and said front wheels each rotate 360°.

6. The powered mobility aid of claim 1 wherein said power source includes a battery pack and two electric motors, one motor engaged with each front wheel respectively and a control stick in communication with said battery pack and each electric motor for independently operating each of said motors to drive and steer the powered mobility aid.

7. The powered mobility aid of claim 6 wherein said front wheels are fixed in one operable position and said rear wheels each rotate 360°.

8. The powered mobility aid of claim 1 wherein said track members are integrally formed with the bottom surface of said seat.

9. The powered mobility aid of claim 1 wherein each of said front legs is engaged with a respective track member and slidable in said respective track member and said rear legs are each pivotally engaged with the bottom surface of said seat.

10. The powered mobility aid of claim 9 further including a foot rest member proximate said front cross beam.

11. The powered mobility aid of claim 10 wherein said foot rest member includes at least one support member pivotally engaged to fold between an open position to receive a user's feet and a closed position for storage.

12. The powered mobility aid of claim 9 wherein said power source includes a battery pack and two electric motors, one motor engaged with each rear wheel respectively and a control stick in communication with said battery pack and each electric motor for independently operating each of said motors to drive and steer the powered mobility aid.

13. The powered mobility aid of claim 12 wherein said rear wheels are fixed in one operable position and said front wheels each rotate 360°.

14. The powered mobility aid of claim 9 wherein said power source includes a battery pack and two electric motors, one motor engaged with each front wheel respectively and a control stick in communication with said battery pack and each electric motor for independently operating each of said motors to drive and steer the powered mobility aid.

15. The powered mobility aid of claim 14 wherein said front wheels are fixed in one operable position and said rear wheels each rotate 360°.

16. The powered mobility aid of claim 9 wherein said track members are integrally formed with the bottom surface of said seat.

* * * * *